July 28, 1959 C. W. CLARAS 2,897,289

MAGNETIC RECORDER-REPRODUCER

Filed Jan. 28, 1955 2 Sheets-Sheet 1

Inventor:
Carl W. Claras.

By. Zabel, Baker, York, Jones + Dithmar
Attorneys.

Inventor.
Carl W. Claras,

By. Zabel, Baker, York, Jones & Dithmar
Attorneys.

United States Patent Office 2,897,289

Patented July 28, 1959

2,897,289

MAGNETIC RECORDER-REPRODUCER

Carl W. Claras, Chicago, Ill., assignor to Revere Camera Company, Chicago, Ill., a corporation of Delaware Application January 28, 1955, Serial No. 484,694

4 Claims. (Cl. 179—100.2)

This invention relates to a magnetic recorder-reproducer of the type having a power amplifier and speaker both for monitoring during recording and for reproduction during playback. While the invention may be applied to magnetic recorder-reproducers generally, it is particularly applicable to the type of magnetic devices having wire or tape as the record medium. For convenience, a magnetic tape recorder-reproducer will be assumed.

As is well known, during recording sound waves are converted into electric waves and are thereafter suitably amplified. The amplified electric waves are impressed upon a recording head, the waves being at a suitable energy level for proper recording. Just prior to the recording of the audio-frequency electric waves it is the general practice to impress upon the record medium magnetic fields at super audible frequency for the purpose of biasing and/or erasing. Substantially all magnetic recorder-reproducers using wire or tape require erasing as well as biasing frequencies to be impressed upon the record medium during the recording process. Customarily the erase and bias magnetic fields are obtained from an oscillator at frequencies which may range from as low as 20,000 cycles per second up to 150,000 c.p.s. In practice, some intermediate frequency is used such as, for example, 35,000 c.p.s.

For proper erasing with high frequency fields, it is essential that the fields be sufficiently intense to secure saturation of the record medium. Consequently, the power required for generating erasing fields is substantially higher than that required for bias purposes. Insufficient power for erasing results in the failure to remove components of previous recorded matter.

It is clear, therefore, that the energy level of the erase field is determined by the energy level of the sound recording field. For recording sound or music or other matter picked up by an average microphone, it is generally necessary to have at least one so-called pre-amplifier stage feeding into a driver stage and the latter feeding into a power or current amplifier. The pre-amplifier stage may have an amplification ratio of the order of about 100 while the driver stage may have an amplification ratio of about 10 or 20.

For proper erase action as well as bias frequency action, an oscillator should be provided which works at an average power level about equal to the level in the current or power amplifier or at some level between the driver and power amplifier power levels.

During playback, more amplification than for recording is generally necessary between the pickup head and the driver stage. This is due to the larger output of a microphone as compared to a magnetic pickup head and also to the fact that a speaker takes more power than a recording head. As a rule during playback as much as 100 db of amplification is used. For recording, about 50 or 60 db is ample.

Thus during playback, it is common to provide two stages of pre-amplification providing an overall gain of between about 1,000 and about 15,000. There is no necessity for any source of high frequency oscillation during playback with the result that the oscillator system is either disabled or disconnected from the system.

A magnetic device having such an amplifier arrangement does not use all its components efficiently, the oscillator tube being useless except during recording. Since many of the magnetic recorder-reproducers now manufactured are of the portable type and since the market is highly competitive, attempts have been made to overcome this problem of the inefficient use of the oscillator tube.

Thus it has been proposed to convert one of the two pre-amplifiers used in playback to an oscillator for recording. This is not satisfactory. As is well known, a pre-amplifier stage provdes voltage amplification and operates at a low power level. The input circuit for a pre-amplifier stage is biased so that no power is drawn. Interstage coupling through condensers may be used. Vacuum tubes suitable for this purpose have a high anode to cathode impedance which permits the tube to have a high amplification factor.

Attempting to derive erasing power from a pre-amplifier stage is doomed to failure because of the minute power available. Any attempt to increase the power handling ability of the tube seriously impairs its value as a pre-amplifier stage.

Another proposal to solve the above problem has involved the diversion of the power amplifier to use as an oscillator. While a power amplifier stage will easily provide sufficient power when used as an oscillator for satisfactory erasing, complete disability of the power amplifier stage and speaker will result during recording. If, for example, it is desired to monitor the recording, the failure to have satisfactory power amplication and a speaker will render monitoring impossible.

In general this invention provides for the use of two stages of pre-amplification and a power amplification stage in a magnetic recorder-reproducer at all times during both recording and/or reproducing. During recording, a magnetic recorder-reproducer embodying the invention feeds the output from the second pre-amplifier stage directly to the power amplifier for use in the recording head and also in the speaker, if desired. At the same time an oscillator is effective and supplies erase and bias frequency to erase and record windings of the sound head. During playback, the magnetic recorder-reproducer embodying the invention utilizes the stage which was used as an oscillator during recording as a driver stage between the second pre-amplifier stage and the power amplifier. A driver stage requires no power input but does deliver a small amount of power to be dissipated in the input of a power amplifier. As is well known, a power amplifier requires power at the input and will deliver power at the output. Power, of course, requires voltage and current for use in a load.

A magnetic recorder-reproducer embodying the present invention as disclosed above utilizes all the vacuum tube stages for both recording and playback and at the same time provides for increased amplification during playback, which increased amplification is generally necessary.

Other objects, advantages and details of the invention will be apparent as the description proceeds, reference being had to the accompanying drawings wherein one form of the invention is shown. It is to be understood, however, that the description and drawings are illustrative only and that the scope of the invention is to be measured by the appended claims.

Figure 1:
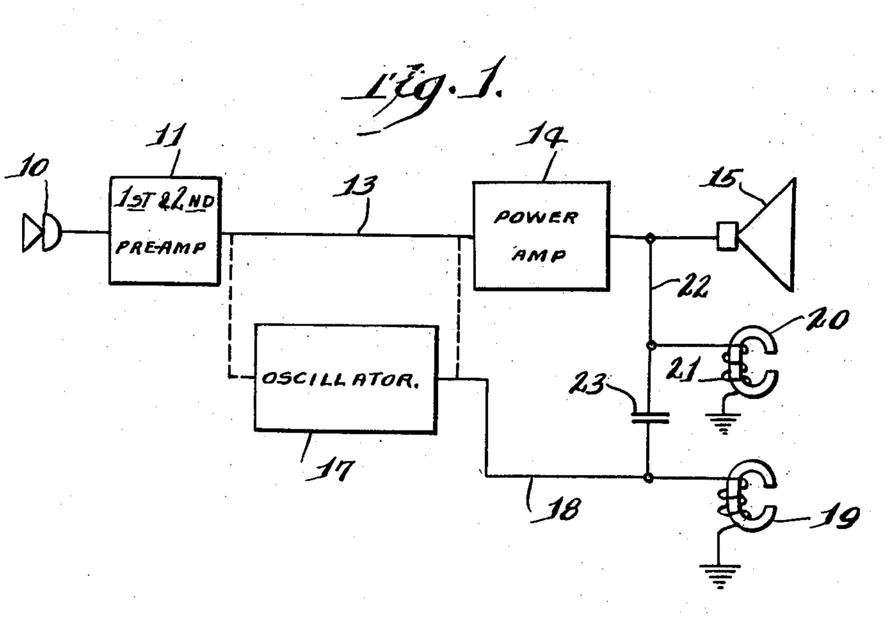
Fig. 1 shows a block diagram of a magnetic recorder-reproducer embodying the invention, the circuit components being connected for recording.

Referring first to Fig. 1, 10 indicates a transducer source of sound currents to be recorded. For most purposes transducer 10 may be a microphone, a phonograph pick-up, or the output of a radio receiver. Transducer 10 is connected to the input of an amplifier 11 which is a conventional two-stage pre-amplifier. A pre-amplifier stage may here be defined as a stage providing voltage amplification and drawing no power on the input, and coupled to a succeeding stage which does not require any input power. A pre-amplifier stage generally has an amplification factor of from about 30 up to 100 or even more. Thus a two-stage pre-amplifier may provide an over-all voltage amplification of as much as 10,000.

The output of the final pre-amplifier stage is fed along channel 13 to power amplifier 14. Power amplifier 14 may have one or more stages of amplification and is primarily adapted to provide current amplification for speaker 15. While the input to power amplifier 14 may draw some current, the amplifier is designed to impose minimum power demands upon the output of pre-amplifier 11.

An oscillator 17 is connected by channel 18 to the winding of erase head 19. Oscillator 17 supplies alternating current at a frequency of suitable value such as about 35,000 cycles per second, as an example. Oscillator 17 has sufficient power, e.g. the order of 5 watts, to supply a load while still maintaining its oscillations.

Record head 20 has winding 21 which is supplied by audio frequency current from channel 22 connected to the output of power amplifier 14 and by bias currents from oscillator 17 through some means such as, for example, coupling condenser 23 between channel 18 and winding 21. As is well known, the bias frequency supplied to record head 20 is at a substantially lower power level than the same frequency applied to the erase head. In fact, the bias frequency supplied to record head winding 21 is generally at about the same general power level as the audio frequency currents from channel 22. Means may be provided in channel 22 for effecting any required reduction in potential of the sound currents applied to winding 21.

Figure 2:
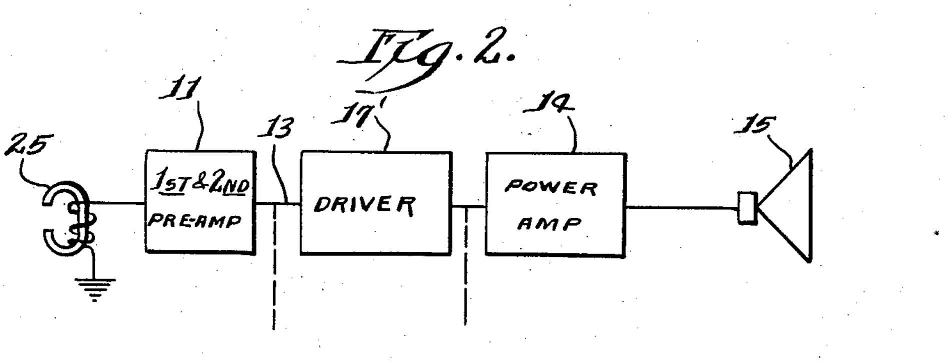
Fig. 2 shows a block diagram of a magnetic-recorder-reproducer embodying the invention, the circuit components being connected for playback.

Referring now to Fig. 2, the system illustrated in Fig. 1 is shown as modified for playback. Playback head 25 which in practice is the same as record head 20 is now connected to the input of pre-amplifier 11.

Oscillator stage 17 has now been transformed into a driver stage 17' and has been switched into channel 13 between the output of pre-amplifier 11 and the input of power amplifier 14. Because of the low power level at which playback head 25 operates it is imperative that pre-amplifier 11 be high gain and that no load be imposed upon its output.

Thus in the record condition of the system as illustrated in Fig. 1, the potential supplied to the input of the first stage of pre-amplifier 11 is generally high enough so that the second pre-amplifier stage may be operated as a sort of driver stage with some power to the input of power amplifier 14. However, in the playback condition of the system illustrated in Fig. 2, it is imperative that both stages of pre-amplifier 11 be free of any power load to gain maximum amplification.

The driver stage 17' draws no applicable power at its input but is capable of supplying a small amount of power to power amplifier 14. This power usually is of the order of ¼ watt.

The system when used for playback may require an overall gain of about 100 db between the playback head and the speaker. When used for recording, the overall gain between the average microphone and record head will be of the order of about 45 to 50 db. The difference in gain in the two systems may be accomplished by having a lower gain in the pre-amplifier stage during recording and the elimination of the driver stage. During playback, the pre-amplifier stages are operated to provide maximum gain, the driver stage providing some additional voltage gain.

It will be clear that the various stages in the entire magnetic recorder and reproducer operate at maximum efficiency with this arrangement.

Figure 3:
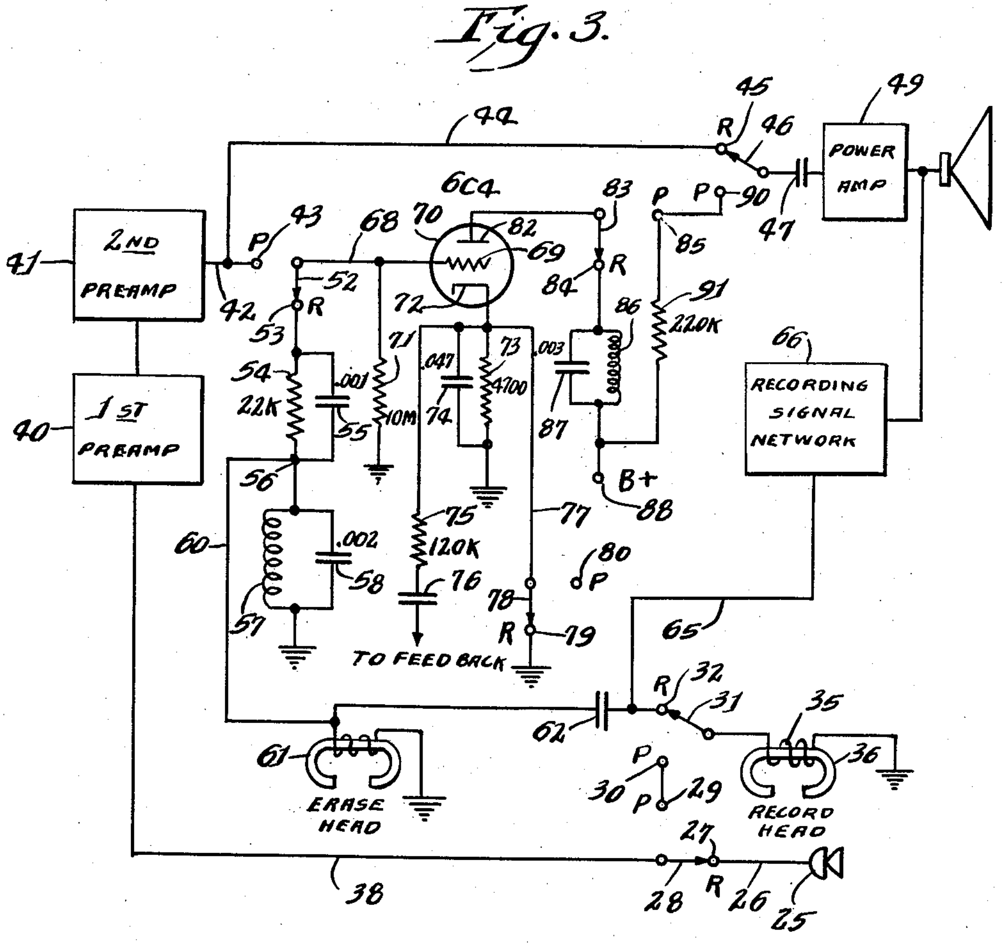
Fig. 3 shows a simplified schematic of a system embodying the invention.

Referring now to Fig. 3, there is shown a simplified schematic example of a system embodying the present invention. Microphone 25 is connected by wire 26 to a switch contact 27 of a gang switch having fixed record and playback contacts and having movable contacts operating between the same. In one position of the switch, conditions for recording are set up and in the other condition of the switch conditions for playback are set up. For convenience, the letters R for record and P for playback are applied to the various switch points in addition to identifying numbers.

Cooperating with record switch contact 27 is movable contact 28 which is shown closed against the contact 27. An associated playback contact 29 is connected to a second playback contact 30. Cooperating with contact 30 is movable contact 31 which as shown is closed against record contact 32. Movable contact 31 is connected to one end of winding 35 of record head 36. The other end of winding 35 is grounded.

Referring back to movable contact 28, the contact is connected by wire 38 to the input of first pre-amplifier stage 40. The output of pre-amplifier stage 40 is connected to the input of second pre-amplifier stage 41. Each of the pre-amplifier stages may include one-half of a double triode of suitable type, such as, for example, a 12AX7 tube. This tube when supplied with suitable bias and anode potential can provide an amplification ratio up to 100 per stage.

The output of pre-amplifier 41 is connected by wire 42 to switch contact 43. A wire 44 connects contact 43 to switch contact 45 which cooperates with movable contact 46 of the gang switch, this movable contact being connected by coupling condenser 47 to the input of power amplifier 49. Power amplifier 49 may consist of one or more stages of amplification and, as an example, may consist of one stage having a type 6V6GT tube. Such a tube is capable of providing an output of several watts of audio frequency power.

Referring back to switch contact 43, a movable contact 52 operates between contact 43 and associated contact 53. Contact 53 is connected through a network consisting of resistor 54 and shunt condenser 55 to junction 56. Junction 56 is connected to ground through inductance 57 and shunt condenser 58. Junction 56 also is connected by wire 60 to one terminal of the winding of erase head 61. The other terminal of the erase head winding is grounded. The erase head may be any one of a number of different constructions and since such constructions are well known, no detailed description thereof is necessary.

Wire 60 continues to one terminal of condenser 62, the other terminal of this condenser being connected to the aforesaid switch contact 32. Switch contact 32 is connected by wire 65 through compensating network 66 to the output of power amplifier 49. Network 66 is provided to compensate for the characteristics of the recording head, such compensation being well known in the art.

Referring back to movable switch contact 52, the contact is connected by wire 68 to control grid 69 of a vacuum tube generally indicated by 70. Vacuum tube 70 is of the type which may have a power output of the order of about one or two watts or higher. An example of a tube which may be used is a 6C4 having a power output up to 5.5 watts as a class C amplifier and requiring a driving power of the order of about ⅓ watt. These figures are exemplary and the type tube and the power level will vary within limits depending upon operating factors and conditions of the recorder-reproducer. For magnetic recording tape available on the market and adapted to operate with either one or two tracks thereon and having a tape speed up to as much as 15 inches per second, the type tube previously specified, 6C4, has been found to be adequate when the tube is operated under recommended conditions of grid bias and anode potential.

Control grid 69 of vacuum tube 70 is connected to ground through grid resistor 71. Cathode 72 of the vacuum tube is connected to ground through resistor 73 shunted by by-pass condenser 74. The cathode also is connected through resistor 75 and blocking condenser 76 to a feed-back network terminating at one of the pre-amplifiers for the purpose of modifying the overall amplifier characteristics. Such feed-back networks and feed-back connections are well known in audio frequency amplifiers for modifying low and high frequency characteristics.

Cathode 72 also is connected by wire 77 to movable switch contact 78 cooperating with contacts 79 and 80 respectively. Contact 79 is grounded while contact 80 is dead in the circuit as shown. Contact 79 is connected to movable contact 78 during recording, thus short-circuiting the aforesaid networks connected to cathode 72. During recording, vacuum tube 70 will function as an oscillator whereas during playback when movable contact 78 is on contact 80, tube 70 will function as an amplifier provided with corrective networks.

Vacuum tube 70 has anode 82 connected to movable contact 83 cooperating with fixed contacts 84 and 85. Contact 84 which is used for recording is connected through inductance 86 shunted by condenser 87 to terminal 88. Terminal 88 is adapted to be connected to a suitable source of plate potential. Inductances 57 and 86 and condensers 58 and 87 cooperate during recording to provide erase and bias oscillations at a desirable frequency.

Switch contact 85 is connected to switch contact 90 which cooperates with movable switch contact 46. Fixed switch contact 85 also is connected through dropping resistor 91 to terminal 88.

It is understood that the various movable switch contacts 28, 31, 46, 52, 78 and 83 are all ganged together so that they may be moved simultaneously from recording (R) to playback (P) as desired.

During recording, the output of second pre-amplifier 41 is fed directly to the input of power amplifier 49. The second stage of the pre-amplifier thus functions as a driver stage so that in effect one pre-amplifier stage is provided and one driver stage is provided. During such recording conditions, vacuum tube 70 functions as an oscillator and is adapted to deliver several watts of high frequency power for erase and bias purposes. During playback, vacuum tube 70 functions as a driver stage, the input of which is energized by the output of the second pre-amplifier stage.

When second pre-amplifier stage 41 functions as a driver, the amplification ratio is reduced from its maximum value. It is understood, therefore, that when the tube of second pre-amplifier 41 is used as a driver, the voltage amplification will be substantially smaller than the voltage amplification as a pre-amplifier.

In essence, therefore, the invention contemplates the conversion of an oscillator stage providing adequate power for erasing and bias purposes in a magnetic recorder-reproducer to an amplifying stage where the output of the stage compared to the input provides for moderate voltage amplification and also provides for moderate current amplification.

From the above description it is thought that the construction and advantages of my invention will be readily apparent to those skilled in the art. Various changes in detail may be made without departing from the spirit or losing the advantages of the invention.

Having thus described my invention, what I claim as new and desire to secure by Letters Patent is:

1. In a magnetic recorder-reproducer of the type having a transducer head for recording or reproducing and having an erase head and amplifier stages with a speaker, the combination of successive amplifier stages ranging in power handling capacity from pre-amplifiers to driver stages and thence to power stages, switching means for converting the stage immediately ahead of a power stage into a driver stage during playback and into an oscillator during recording, said switching means providing an audio-frequency channel from a pre-amplifier stage directly to a power stage during recording and providing a direct channel from the output of the oscillator to the erase head, connections between said erase and recording heads for feeding said recording head some oscillator power for bias during recording, most of the oscillator power going to the erase head, said oscillator stage during recording having a power output of the order of about 1 watt or more and being sufficiently great to insure erasing and to provide biasing power, said stage during playback functioning as a driver stage, the power input to said driver stage being sufficiently low so that a preceding pre-amplifier stage may adequately supply the same, said system having such high efficiency as to allow the power amplifier to be used for monitoring during recording.

2. In a magnetic recorder-reproducer of the type having erase and transducer heads, speaker and amplifier stages, said device during playback having two stages of pre-amplification followed by a driver stage feeding into a power amplifier, the combination of switching means for disconnecting said driver stage and converting the same into an oscillator for supplying erasing and biasing power, said switching means providing an audio-frequency channel from the output of the second pre-amplifier stage directly to the input of said power amplifier during recording and providing a direct connection from the output of the oscillator to the erase head, said switching means also providing, during recording, connections to the recording head from the outputs of both the power stage and oscillator, most of the oscillator power going to the erase head, said system having such high efficiency as to allow the power amplifier to be used for monitoring during recording.

3. The system according to claim 2 wherein said stage convertible from a driver to an oscillator operates at a power level at the output of the stage of the order of about ¼ to 5 watts.

4. The system according to claim 2 wherein said convertible stage when used as a driver operates at a power output level of the order of about ¼ watt and when used as an oscillator operates at a power level of the order of about 5 watts.

References Cited in the file of this patent

UNITED STATES PATENTS

| | | |
|---|---|---|
| 2,563,545 | Moreland | Aug. 7, 1951 |
| 2,654,003 | Dashiell | Sept. 29, 1953 |